United States Patent
Baraz

(10) Patent No.: US 7,076,769 B2
(45) Date of Patent: Jul. 11, 2006

(54) APPARATUS AND METHOD FOR REPRODUCTION OF A SOURCE ISA APPLICATION STATE CORRESPONDING TO A TARGET ISA APPLICATION STATE AT AN EXECUTION STOP POINT

(75) Inventor: Leonid Baraz, Kiryat-Ata (IL)

(73) Assignee: Intel Corporation, Santa Clara, CA (US)

( * ) Notice: Subject to any disclaimer, the term of this patent is extended or adjusted under 35 U.S.C. 154(b) by 350 days.

(21) Appl. No.: 10/401,468

(22) Filed: Mar. 28, 2003

(65) Prior Publication Data

US 2004/0194070 A1    Sep. 30, 2004

(51) Int. Cl.
G06F 9/45    (2006.01)
(52) U.S. Cl. ............... 717/136; 717/130; 717/154
(58) Field of Classification Search ............ 717/136, 717/138, 146, 151, 153, 159, 130, 154
See application file for complete search history.

(56) References Cited

U.S. PATENT DOCUMENTS

| | | | | |
|---|---|---|---|---|
| 5,958,061 A * | 9/1999 | Kelly et al. | ............... | 714/1 |
| 5,974,524 A * | 10/1999 | Cheong et al. | ............... | 712/23 |
| 6,154,877 A * | 11/2000 | Ramkumar et al. | ......... | 717/114 |
| 6,345,351 B1 * | 2/2002 | Holmberg | ................ | 711/203 |
| 6,425,118 B1 * | 7/2002 | Molloy et al. | ............. | 717/136 |
| 6,594,821 B1 * | 7/2003 | Banning et al. | ........... | 717/136 |
| 6,631,514 B1 * | 10/2003 | Le | ............... | 717/137 |
| 6,795,966 B1 * | 9/2004 | Lim et al. | ............ | 718/1 |
| 6,820,255 B1 * | 11/2004 | Babaian et al. | ........... | 717/151 |
| 6,826,682 B1 * | 11/2004 | Rozas et al. | ............. | 712/244 |
| 2002/0092002 A1 * | 7/2002 | Babaian et al. | ........... | 717/137 |

OTHER PUBLICATIONS

Bowen, Nicholas S; Pradhan, Dhiraj K; "Virtual Checkpoints: Architecture and Performance", p. 516-525, 1992 IEEE, retrieved May 11, 2005.*
Cifuentes, Cristina; Emmerik, Mike Van; Ramsey, Norman; "The Design of a Resourceable and Retargetable Binary Translatror", p. 280-291, Oct. 1999, IEEE, retrieved May 16, 2005.*
Dehnert, J; Grant, B; Banning, J; Johnson, R; Kistler, T; Klaiber, A; Mattson, J; "The Transmeta Code Morphing Software: Using Speculation, Recovery, and Adaptive Retranslation to Address Real-Life Challenges", 2003, retrieved May 16, 2005.*
Li, Kai; Naughton, Jeffrey F; Plank, James; "Real-Time Concurrent Checkpoint for Parallel Programs", p. 79-88, 1990 ACM, retrieved May 9, 2005.*

* cited by examiner

*Primary Examiner*—Wei Zhen
*Assistant Examiner*—Mary Steelman
(74) *Attorney, Agent, or Firm*—Blakely, Sokoloff, Taylor & Zafman LLP

(57) ABSTRACT

A method and apparatus for reproduction of a legacy ISA application corresponding to a target ISA application state at an execution stop point are described. In one embodiment, the method includes the translation of a binary application generated for a legacy instruction set architecture (ISA) into a translated binary application for a target ISA. During translation, one or more instructions within the translated binary application are selected as commit point instructions. Once selected, the translated binary application is modified to store a source ISA application state corresponding to a target ISA application state prior to each selected commit point. In addition, the selected commit points indicate the location of the stored source ISA application state information.

30 Claims, 11 Drawing Sheets

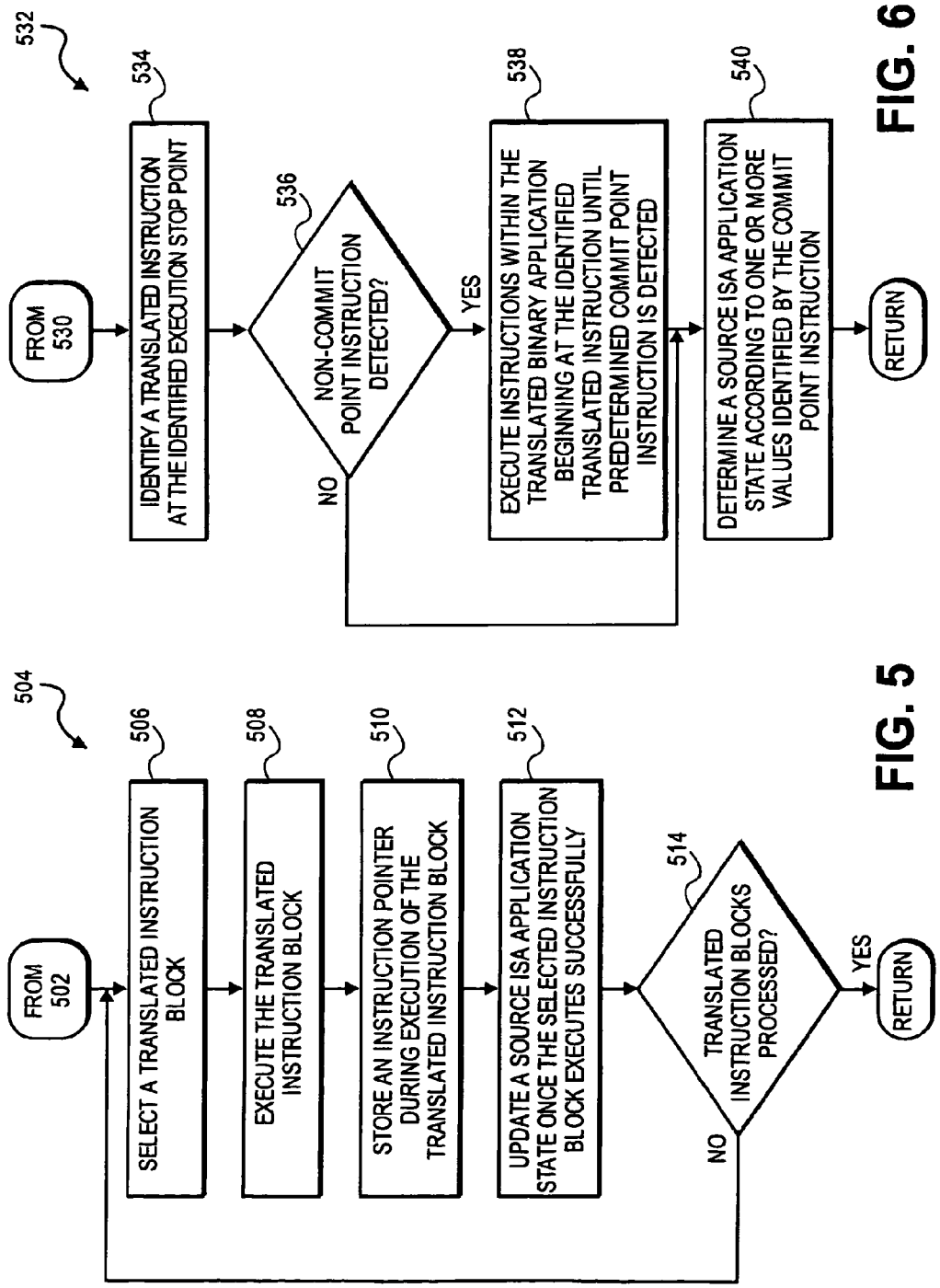

US 7,076,769 B2

APPARATUS AND METHOD FOR REPRODUCTION OF A SOURCE ISA APPLICATION STATE CORRESPONDING TO A TARGET ISA APPLICATION STATE AT AN EXECUTION STOP POINT

FIELD

One or more embodiments of the invention relate generally to the field of binary application translation. More particularly, one or more of the embodiments of the invention relates to a method and apparatus for reproduction of a legacy ISA application corresponding to a target ISA application state at an execution stop point.

BACKGROUND

Generally, computer programs are initially written in high level program statements. In order to be executed by a computer, the program statements are compiled into machine instructions that a microprocessor can recognize and execute. The machine instructions are selected from a set of machine instructions unique to a particular instruction set architecture (ISA).

Computer program statements that have been decoded into machine instructions for a source ISA such as Intel® X86, may undergo a binary translation in order to be executed at a target ISA, such as a reduced instruction set computer (RISC) architecture, or a very long instruction word (VLIW) architecture.

The translation may be performed by a dynamic translator, typically stored in memory. During translation, instructions are typically translated one basic block of instructions (BB) at a time and stored in memory. For example, each basic block of instructions may include a contiguous sequence of non-branch instructions (i.e., do not change order of executing instructions) which typically ends with a conditional branch instruction.

Unfortunately, translated executable (binary) applications are generally not optimized in order to take advantage of the various optimization techniques provided by the target ISA. The performance of the target ISA is often a function of how well the processor manipulates and controls the flow of data within the system. As such, a target ISA can generally provide increased speed and throughput of instructions executed by the processor, as a result of several decades of engineering and research for optimizing instruction execution and data throughput as compared to a legacy (source) ISA. For example, the processors of the target ISAs achieve increased performance by executing instructions out of their original program order. By scheduling instructions according to availability of machine resources the processor is allowed to take advantage of parallelism inherent in the code.

Unfortunately, optimization of translated code is generally prohibited since the translation is generally limited to execution of translated instructions according to the program order provided in the source binary application. Otherwise, it may be difficult to determine a source ISA application state, according to a current target ISA application state. Furthermore, a single source or legacy instruction may be translated into several target ISA instructions. As a result, it is often difficult to determine correspondence between a target ISA application instruction and a source ISA application instruction.

BRIEF DESCRIPTION OF THE DRAWINGS

The various embodiments of the present invention are illustrated by way of example, and not by way of limitation, in the figures of the accompanying drawings and in which:

FIG. 5 is a flow chart illustrating a method for execution of a translated binary application, in accordance with one embodiment of the invention.

FIG. 6 is a flow chart illustrating a method for determining the source ISA application state, as depicted in FIG. 4, in accordance with one embodiment of the invention.

DETAILED DESCRIPTION

A method and apparatus for reproduction of a legacy ISA application corresponding to a target ISA application state at an execution stop point are described. In one embodiment, the method includes the translation of a binary application generated for a legacy instruction set architecture (ISA) into a translated binary application for a target ISA. During translation, one or more instructions within the translated binary application are selected as commit point instructions. Once selected, the translated binary application is modified to store a source ISA application state corresponding to a target ISA application state prior to each selected commit point. In addition, the selected commit points indicate the location of the stored source ISA application state information.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logical. The integrated circuit may take the form of a processor such as a microprocessor, application specific integrated circuit, a digital signal processor, a microcontroller, or the like.

An example of "software" includes executable code in the form of an application, an applet, a routine or even a series of instructions. The software may be stored in any type of computer or machine readable medium such as a programmable electronic circuit, a semiconductor memory device inclusive of volatile memory (e.g., random access memory, etc.) and/or non-volatile memory (e.g., any type of read-only memory "ROM," flash memory), a floppy diskette, an optical disk (e.g., compact disk or digital video disk "DVD"), a hard drive disk, tape, or the like.

In one embodiment, the present invention may be provided as an article of manufacture which may include a machine or computer-readable medium having stored thereon instructions which may be used to program a computer (or other electronic devices) to perform a process according to one embodiment of the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

System Architecture

Figure 1:
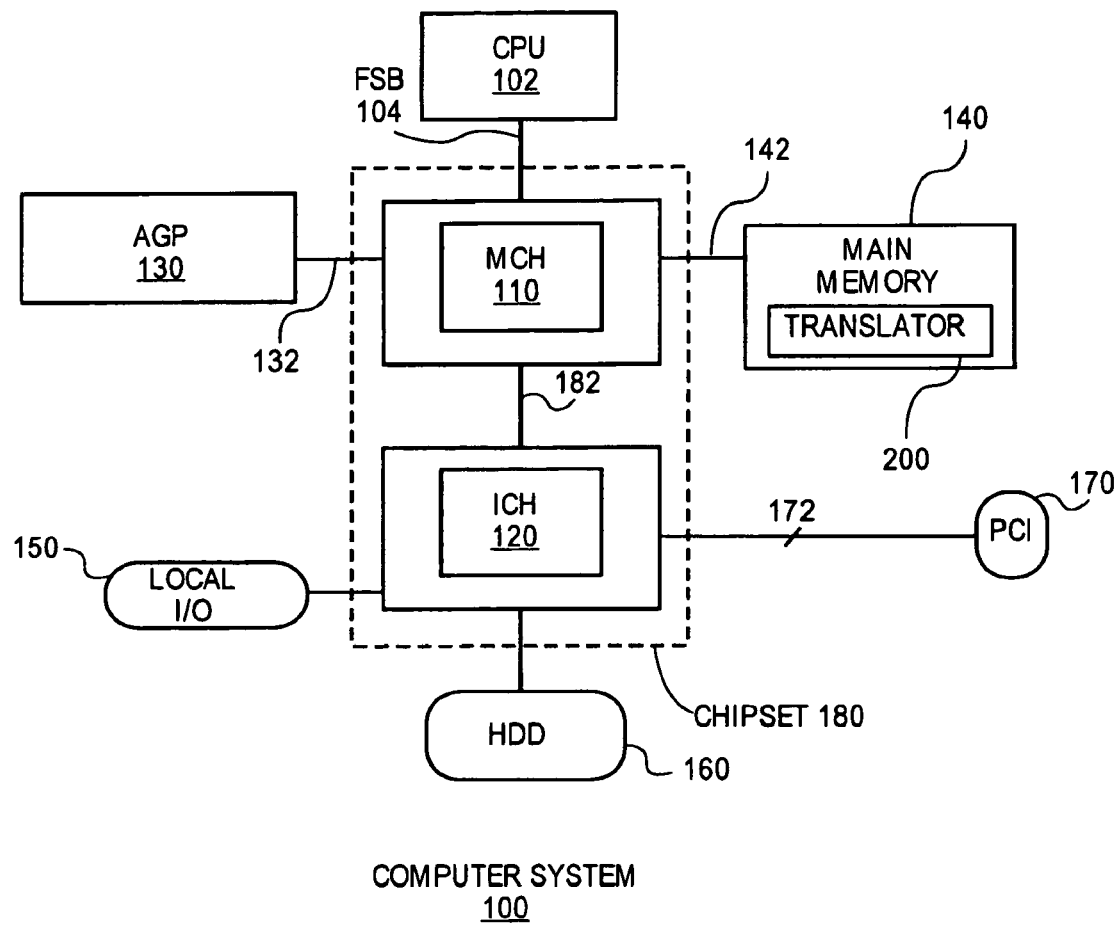
FIG. 1 is a block diagram illustrating a computer system including a dynamic binary translator, in accordance with one embodiment of the invention.

FIG. 1 is a block diagram illustrating a computer system 100 including a dynamic binary translator 200, in accordance with one embodiment of the invention. As illustrated, computer system 100 includes a CPU 102, memory 140 and graphics controller 130 coupled to memory controller hub (MCH) 110 via front side bus (FSB) 104, memory bus 142 and graphics bus 132, respectively. As described herein, MCH 110 may be referred to as a north bridge and, in one embodiment, as a memory controller. In addition, computer system 100 includes I/O (input/output) controller hub (ICH) 120. As described herein ICH 120 may be referred to as a south bridge or 110 controller. South bridge, or ICH 120, is coupled to local I/O 150 and hard disk drive devices (HDD) 160.

In the embodiment illustrated, ICH 120 is coupled to I/O bus 172 which couples a plurality of 110 devices, such as, for example, PCI or peripheral component interconnect devices 170. Collectively, MCH 110 and ICH 120, which are coupled together via link 182, are referred to as chipset 180. As is derived herein, the term "chipset" is used in a manner well known to those skilled in the art to describe, collectively, the various devices coupled to CPU 110 to perform desired system functionality.

In contrast to conventional computer systems, computer system 100 includes dynamic binary translator 200 for translating binary applications written for a source instruction set architecture (ISA) into a target instruction set architecture (ISA) of computer system 100. In one embodiment, computer system 100 may be referred to as a very long instruction word (VLIW) architecture. In one embodiment, computer system 100 is configured as an explicitly parallel instruction computing (EPIC) architecture. As described herein, VLIW architectures, EPIC architectures, and the like are collectively referred to herein as a target ISA. In contrast, as described herein, the term "source ISA" refers to ISAs having instruction words that are smaller that the VLIW architecture capabilities of computer system 100.

In one embodiment, computer system 100 may refer to a computer architecture manufactured by the Intel® Corporation of Santa Clara, Calif., to process, for example, 64-bit, 128-bit, or larger instruction words. In contrast, source ISAs may refer to computer architectures configured to handle 32-bit instruction words. Accordingly, in the embodiments described in further detail below, VLIW instruction set architectures, such as computer system 100, are required to provide compatibility with Legacy or source ISAs by translating binary applications of the source ISAs according to a target ISA of computer system 100. In one embodiment, the translation is performed using dynamic binary translator 200.

Figure 2:
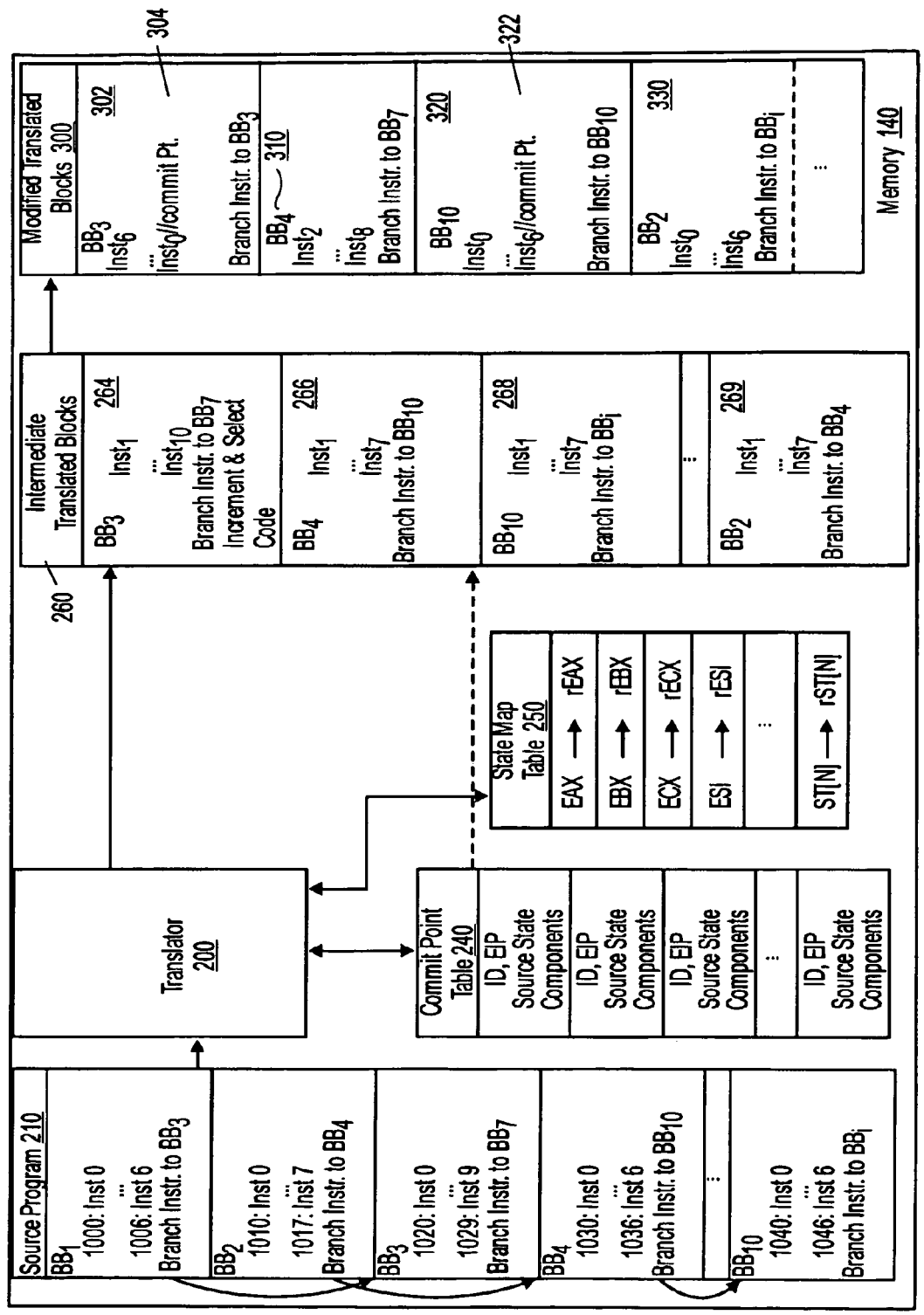
FIG. 2 is a block diagram further illustrating a memory of the computer system illustrated in FIG. 1, including the dynamic binary translator, in accordance with one embodiment of the present invention.

As illustrated in FIG. 2, during dynamic translation, instructions are typically translated one block of instructions (BB) at a time and stored in memory in an area allocated for storing translated BBs. As such, the machine instructions of a source program 210 are typically translated and stored in memory in separate blocks of instructions. In one embodiment, each block of instructions consists of a contiguous sequence of non-branch machine instructions ending with the branch instruction. Accordingly, a binary application, such as the untranslated source binary application 210 of FIG. 2 typically consists of multiple blocks of instructions stored in the physical static sequence (e.g., BB1, BB2, BB3 . . . ).

The order that the blocks of instructions are executed (i.e., order of execution) can be different from the static sequence of the source binary application 210. The execution order is determined by the behavior of the branch instructions in the blocks of instructions. When the branch instruction is taken, the order of execution branches (i.e., transfers) to a separate block of instructions that is separate in the static sequence of the program. Otherwise, the order of execution continues at the block of instructions that immediately follows in the static sequence. Consider, for example, the source binary application 210 shown in FIG. 2. If the branch instruction of BB, is taken, the order of execution branches from BB1 to BB3. BB2, therefore, is not executed in the example order of execution.

Generally, VLIW architectures, such as computer system 100, as depicted in FIG. 1, are optimized to provide increased speed and throughput of instructions executed by the processor. For example, processors such as CPU 110 achieve increased performance by executing instructions out of their original program order. For example, by scheduling instructions according to the availability of machine resources, the processor is allowed to take advantage of parallelism inherent in the code. In one embodiment, computer system 100 is configured as an explicitly parallel instruction computing (EPIC) architecture.

Unfortunately, optimization of translated code is generally prohibited since translation is generally limited to execution of translated instructions, according to the program order provided in the source binary application. Otherwise, it may be difficult to determine a source ISA application state, according to a current target ISA application state. Furthermore, a single source or legacy instruction may be translated into several target ISA instructions. As a result, it is often difficult to determine correspondence between a target ISA application instruction and a source ISA application instruction.

Accordingly, as depicted in FIG. 2, dynamic binary translator 200 utilizes a state map data structure, such as state map table 250, as well as a commit point data structure, such as commit point table 240 to reproduce a source ISA application state corresponding an execution stop point of a translated binary application. As such, in the embodiment depicted, state map table 250 provides a canonic mapping of source ISA state components into corresponding target ISA state components. As described herein, the term "state components" refers to memory state; registers; floating point stack; floating point state; and various flags available from an architecture for program execution. Accordingly, a state map table is generated which maps the source ISA state components to corresponding target ISA state components, as illustrated in table 250.

Likewise, during translation of source program 210, an initial translation into an intermediate format is provided, as illustrated by translated basic blocks 260, including BB3 264, BB4 266, BB10 268 and BB2 269. In one embodiment, the process begins by selecting a static instruction block of the source program 210. Once selected, source instructions of the selected block are translated. However, a source instruction may be translated into several target instructions. Accordingly, in one embodiment, special processing is provided for source instructions which generate, once translated, faulty translated instructions.

For example, if an exception occurs or execution is interrupted, it usually becomes necessary to regenerate or restore a consistent source ISA application state. The source ISA state is reproduced for the point of interruption based on the target ISA application state at the interruption point. The source ISA application state is generally required for two reasons: the operating system requires the source ISA application state for proper exception/interruption processing; or if the execution is to be resumed, it is generally required to be resumed according to the source ISA application state.

Accordingly, in one embodiment of the invention, some or all of the faulty instructions within a translated binary application may be selected as commit point instructions. Representatively, modified translated block 300, including BB3 302, BB4 310, BB10 320 and BB2 330, with commit point instruction 304 selected in BB3 302 and commit point instruction 322 selected in BB10 320. As described herein, the term "faulty translated instructions" refers to all target ISA instructions that may cause exceptions, including memory operations, floating point instructions, branches, and the like. As such, in one embodiment, these faulty instructions may be selected as commit point instructions. As described herein, "commit point instructions" enable the determination or identification of a source ISA application state following a translated binary application execution stoppage (exception/interruption).

As illustrated with reference to FIG. 3 source binary application instruction block 402 is initially translated into intermediate-translated block 420, according to a state map data structure, such as state map 250 of FIG. 2. However, in order to enable reproduction of a source ISA state, the intermediate block 420 is updated to form modified translated instruction block 450. In order to do so, in one embodiment, faulty instructions may be selected as commit points. For example, as illustrated, ST4 instruction 452 is selected as a commit point. As a result, if ST4 instruction 452 causes an exception, translator 200 is able to determine a corresponding source ISA instruction.

In one embodiment, the commit point stores an instruction pointer (EIP) of a corresponding source instruction which is equal to 1,000. In addition, the various commit point instructions may be required to maintain overwritten source ISA state components. For example, as depicted in FIG. 3, exception of ST4 instruction 452 may cause irreversible state changes to registers rESP and rEBP. In one embodiment, these state values are stored in other locations (e.g., registers), according to a mapping described in, for example, a commit point map data structure, such as commit point table 240, as depicted in FIG. 2. As such, the table is a static object—it describes alternative (backup) locations for values, but does not provide room for actually storing values at run-time. In one embodiment, the values are used to reproduce a source ISA state, as described in further detail below. Procedural methods for implementing embodiments of the present invention are now described.

Operation

Figure 4:
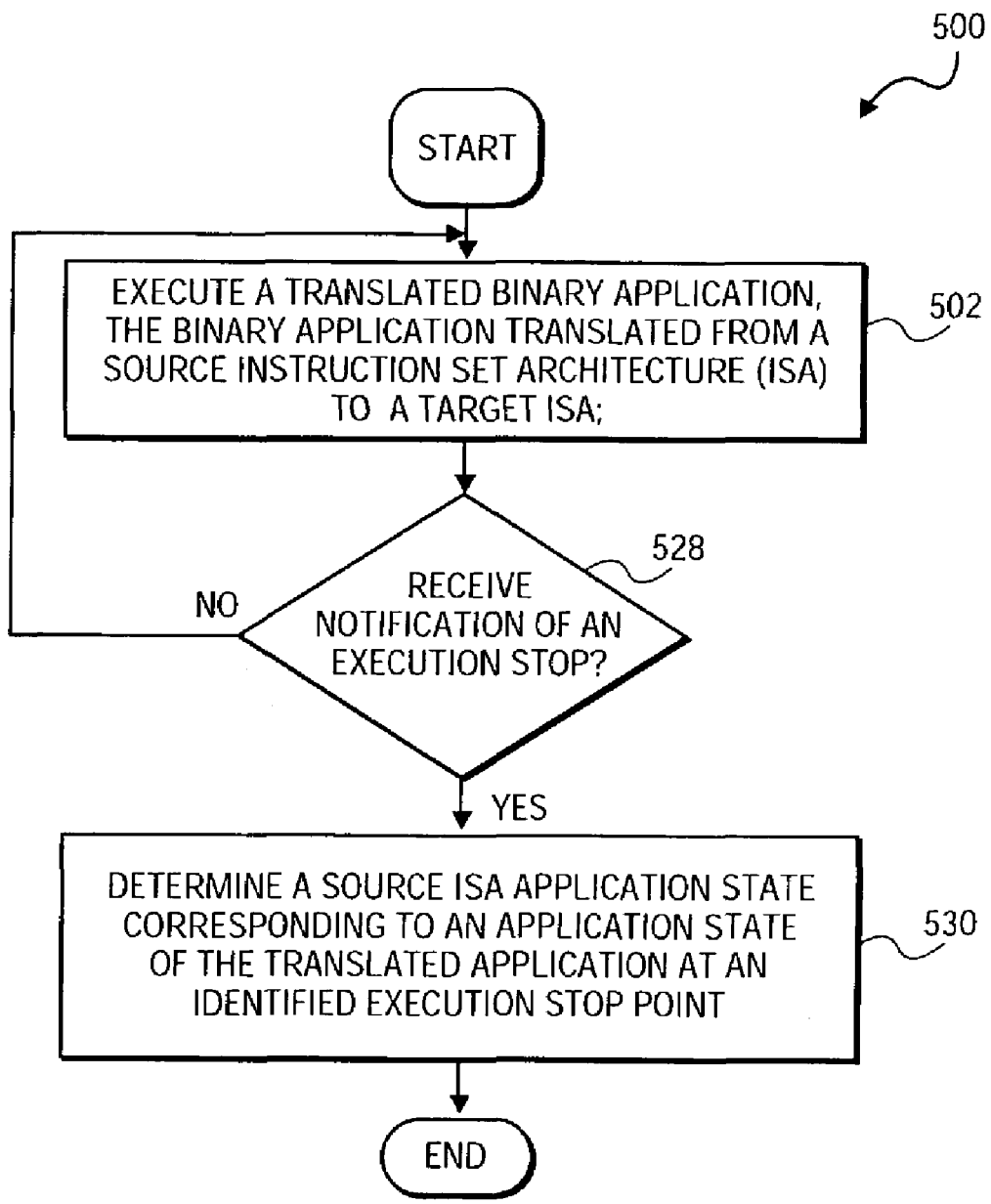
FIG. 4 is a flow chart illustrating a method for reproduction of a source ISA application state following notification of an execution stoppage of a translated binary application, in accordance with one embodiment of the invention.

FIG. 4 is a flow chart illustrating a method 500 for reproduction of a source ISA application state following notification of an execution stoppage of a translated binary application, in accordance with one embodiment of the invention. At process block 502, a translated binary application is executed. In one embodiment, the translated binary application represents a source binary application generated for a source instruction set architecture (ISA). The source binary application is translated to enable execution within a target ISA, for example, as depicted with reference to FIG. 1. Translation of the source binary application is described with reference to FIGS. 9–13.

During execution of the translated binary application, at process block 528, it is determined whether notification of an execution stop is received. In one embodiment, the execution stoppage may include an exception caused by the translated binary application, an interruption which causes the execution stoppage, or any other event which would require stoppage of translated binary application execution. As referred to above, if an exception occurs or execution is interrupted in some way, it is usually necessary to regenerate or restore (reproduce) a consistent source ISA application state based on the target ISA application state at the interruption point.

Accordingly, at process block 530, a source ISA application state of a source binary application, corresponding to an application state of the translated binary application, is determined at an identified execution stop point. In one embodiment, the source ISA application state is based on state information identified at commit point instructions within the translated application, as well as a commit point data structure and a state map data structure. A reproduced source ISA application state following an execution stoppage is provided to, for example, an operating system for exception handling or used to enable resumption of execution in the event of an interruption, in accordance with one embodiment of the invention.

FIG. 5 is a flow chart illustrating a method 504 for execution of a translated binary application of process block 502, in accordance with one embodiment of the invention. At process block 506, a translated instruction block is selected from the translated binary application. Once selected, at process block 508, the translated instruction block is executed. Next, at process block 510, an instruction pointer of a source instruction corresponding to a currently executed translated instruction is stored within, for example, a target ISA register. At process block 512, a source ISA application state is updated once the selected instruction block executes successfully. At process block 514, process blocks 506–512 are repeated for each translated instruction block within the translated binary application.

Accordingly, in the embodiment described, a source ISA application state is initially available according to a state map table, such as, for example, depicted in FIG. 2. As illustrated in FIG. 2, the state map table provides a mapping of state components including source ISA registers, floating point information, stack point information, and the like. For example, as illustrated in state map table 250, the various registers (EAX, EBX, . . . , ESI) of the source ISA are mapped to selected registers of the target ISA (rEAX, rEBX, . . . , rESI). This process is repeated for the various state components of the source ISA.

As a result, prior to execution of the translated binary application, a source ISA application state may simply be detected by referencing the state map table to gather the values from the mapped state components corresponding to the source ISA state components. However, in order to enable optimizations, as well as to preserve mapped source ISA state components, which may be overwritten by target ISA translated instructions, the overwritten state components are stored. In one embodiment, a commit point data structure, such as, for example, commit point table 240, as depicted in FIG. 2 identifies the location of preserved state component values. In one embodiment, this process is performed on a translated instruction block basis. In one embodiment, once a translated instruction block has successfully executed, preserved source ISA state components are stored within the corresponding mapped target ISA state components to update the source ISA application state.

FIG. 6 is a flow chart illustrating a method 532 for determining the source ISA application state of process block 530, as depicted in FIG. 4, in accordance with one embodiment of the invention. At process block 534, a translated instruction is identified at the execution stop point, for example, by its target ISA IP, or by other means. In an alternative embodiment, the translated instruction is provided by the operating system, in the event of an exception. Once identified, at process block 536 it is determined whether the identified instruction is a non-commit point instruction. When such is the case, process block 538 is performed, otherwise control flow branches to process block 540. At process block 538, instructions within the translated binary application are executed, beginning at the identified translated instruction, until a predetermined commit point instruction is detected.

Once detected, at process block 540, a source ISA application state is determined according to one or more values identified by the commit point instruction. In other words, the commit point data structure, such as commit point table 240, depicted in FIG. 2, will include at least an instruction pointer of selected commit point instructions (IP), an instruction pointer of a source ISA instruction (EIP) corresponding to the commit point instructions, as well as current (non-standard) location of state components overwritten prior to the commit point instruction. Accordingly, when an exception occurs, a translator, such as translator 200 (FIG. 2), is able to reproduce a source ISA application state, according to at least a source ISA instruction pointer (EIP), one or more of the overwritten state components in conjunction with information contained in the state map table 250 (FIG. 2).

Figure 7:
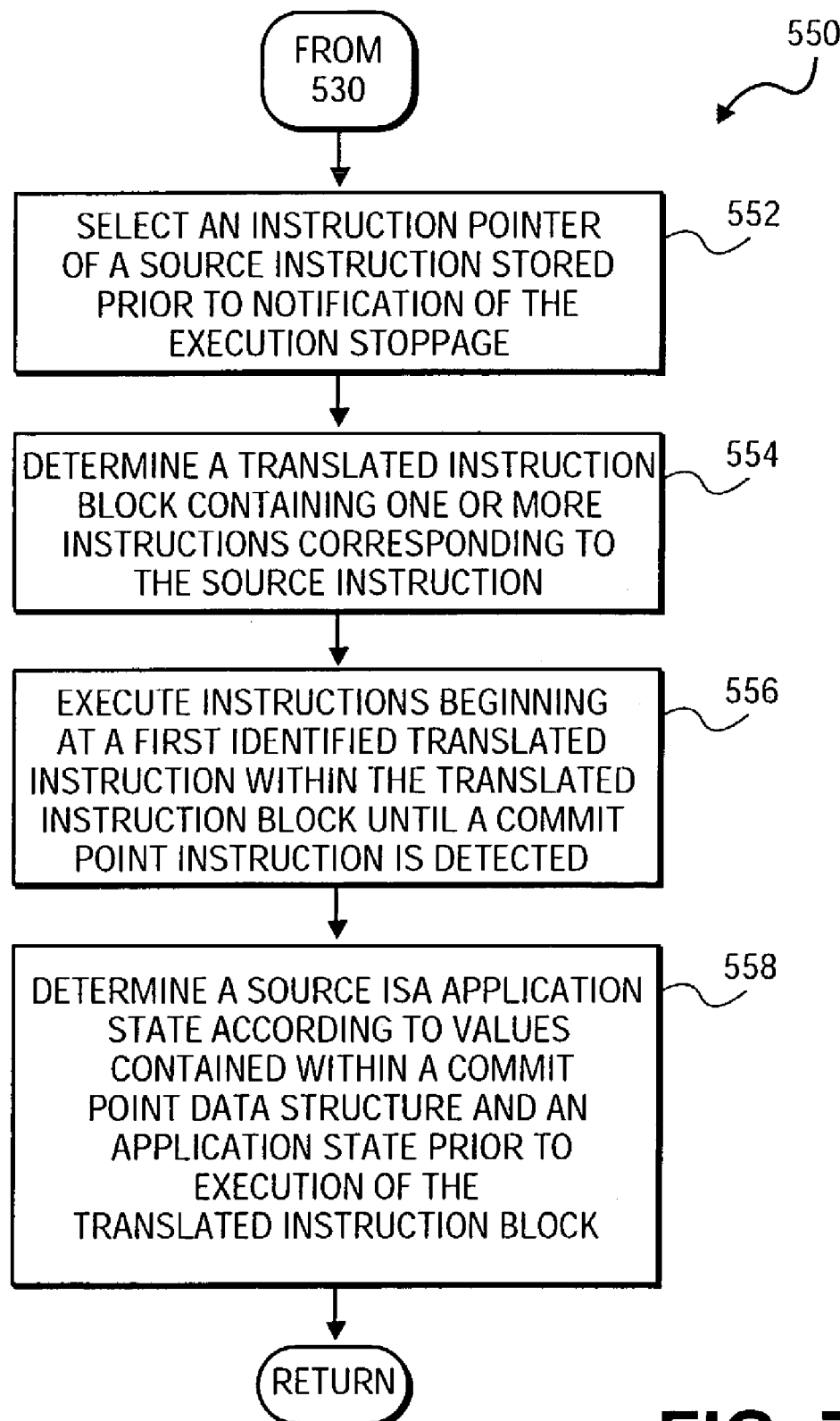
FIG. 7 is a flow chart illustrating a method for determining the source ISA application state, as depicted in FIG. 4, in accordance with one embodiment of the invention.

FIG. 7 is a flow chart illustrating a method 550 for determining the source ISA application state of process block 530, as depicted in FIG. 4, in accordance with one embodiment of the invention. At process block 552, an instruction pointer of a source ISA instruction (EIP), stored prior to notification of the execution stoppage, is selected. At process block 554, a translated instruction block, containing one or more instructions corresponding to the selected source instruction, is determined. Once determined, at process block 556, instructions beginning at a first identified translated instruction are executed until a commit point instruction is detected. At process block 558, a source ISA application state is determined according to values or identified within a commit point data structure, and an application state prior to execution of the translated instruction block.

In other words, in one embodiment, faulty instructions which cause exceptions, as described above, are selected as commit point instructions. In one embodiment, each faulty instruction within the translated binary application may be selected as a commit point instruction. Accordingly, when an exception occurs, the execution stop point will generally reference a commit point instruction. However, if each faulty instruction is not selected as a commit point, or an interruption occurs, the instruction at the execution stop point is generally not a commit point instruction. As a result, instructions within the translated instruction block are executed until a commit point instruction is detected.

Once detected, in one embodiment, the commit point instruction may be used to reference a commit point data structure which will include an EIP of a source ISA instruction corresponding to the commit point instruction. In addition, if state components of the source ISA application are overwritten within the instruction block, one or more of the state components will be indicated in the commit point data structure, as well as the location within the target architecture where the components are located. Accordingly, utilizing this information, as well as an application state prior to execution of a translated instruction block, the source ISA application state may be determined. The application state prior to execution of an instruction block is determined from information contained within a state map data structure.

Figure 8:
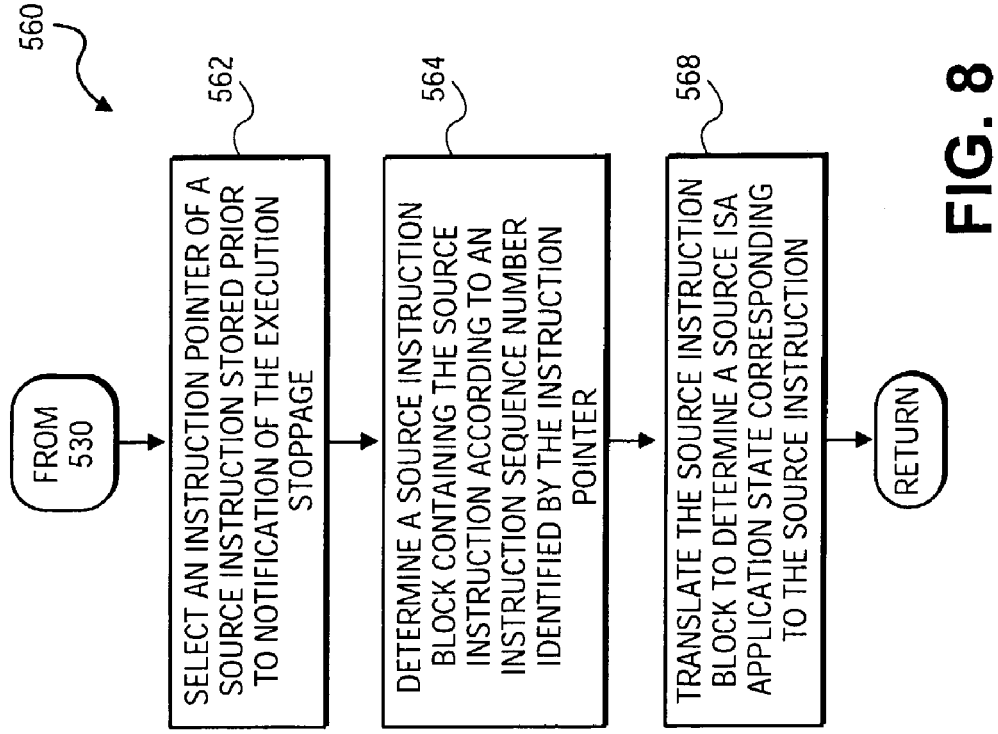
FIG. 8 is a flow chart illustrating a method for determining the source ISA application state, as depicted in FIG. 4, in accordance with one embodiment of the invention.

FIG. 8 is a flow chart illustrating a method 560 for determining the source ISA application state of process block 530, as depicted in FIG. 4, in accordance with one embodiment of the invention. At process block 562, an instruction pointer of a source ISA instruction start prior to notification of the execution stoppage is selected. Once selected, at process block 564, a source instruction block containing the source instruction is determined according to an instruction sequence number identified by the instruction pointer. Finally, at process block 568, the source instruction block is translated to determine a source ISA application state, according to the source instruction.

As described with reference to FIG. 8, in one embodiment, memory resources may be preserved by avoiding creation of a large commit point data structure. As such, in the embodiment indicated, an instruction pointer (EIP) corresponding to the source ISA application is maintained to enable identification of the instruction block within the source binary application when an execution stoppage is detected. Once detected, in one embodiment, the source instruction block is retranslated (without regenerating code) in order to determine an application state.

Figure 9:
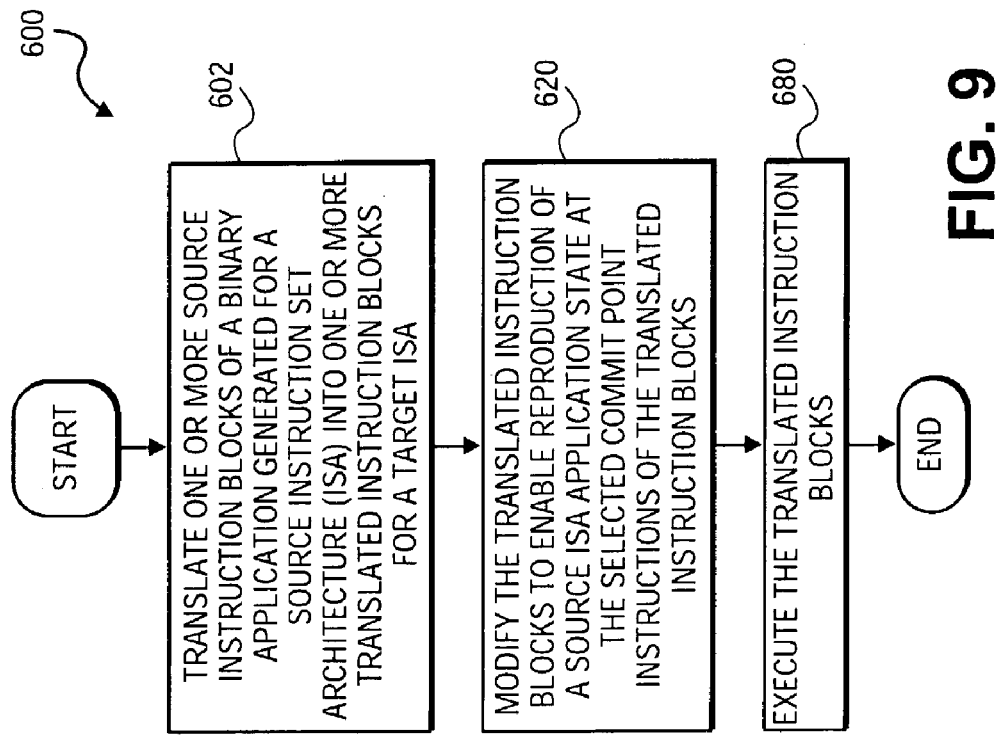
FIG. 9 is a flow chart illustrating a method for translating a source binary application into a translated binary application, while enabling reproduction of the source ISA application state at selected commit point instructions of translated instruction blocks, in accordance with one embodiment of the invention.

FIG. 9 is a flow chart illustrating a method 600 for translating a source binary application into a translated binary application, while enabling reproduction of the source ISA application state at selected commit point instructions of translated instruction blocks, in accordance with one embodiment of the invention. At process block 602, one or more source instruction blocks of the source binary application are translated into one or more translated instruction blocks. Once translated, at process block 620, the translated instruction blocks are modified to enable reproduction of a source ISA application state at selected commit point instructions of the translated instruction blocks. Finally, at process block 680, the modified translated instruction blocks are executed.

Figure 3:
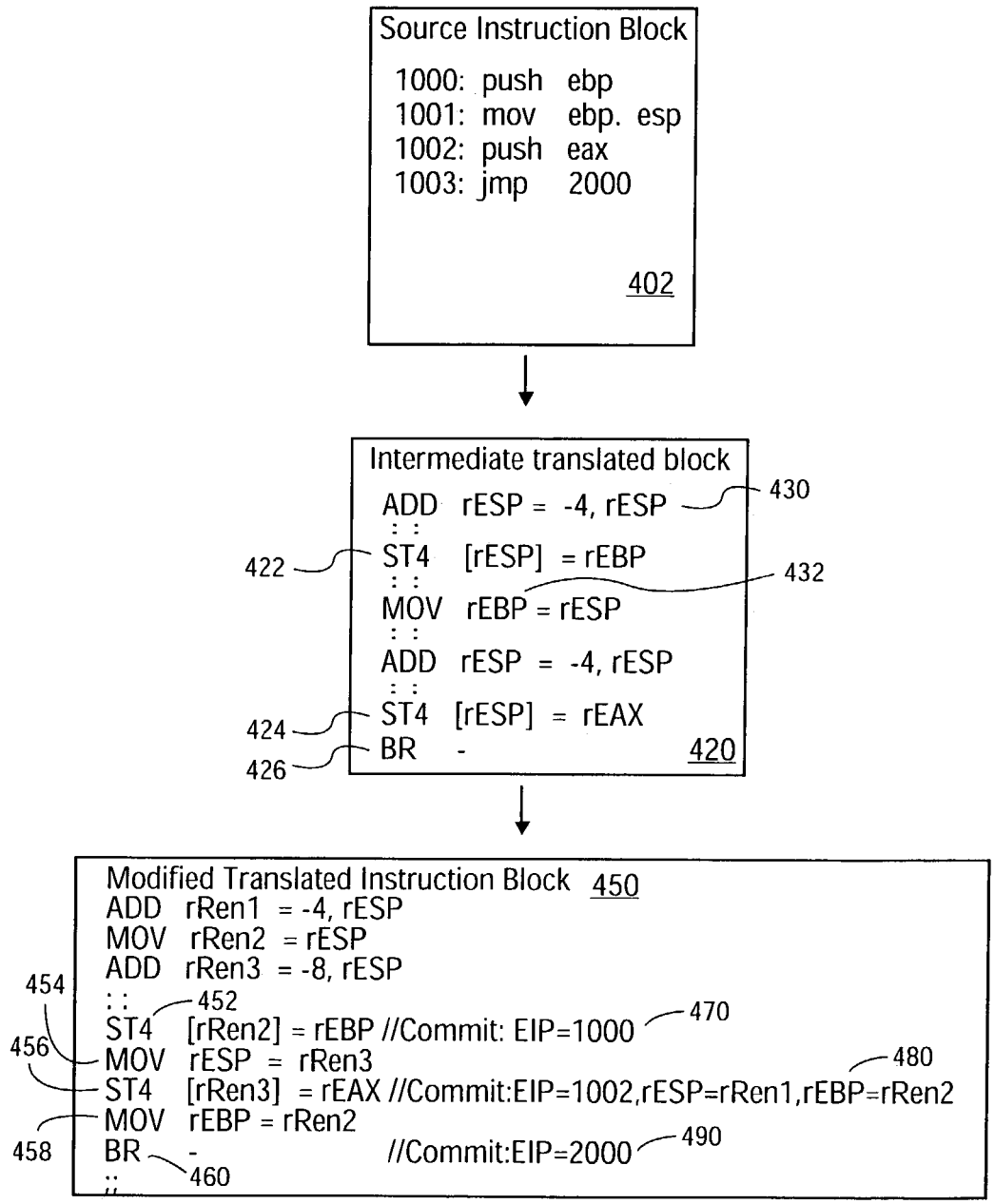
FIG. 3 illustrates dynamic binary translation of a source instruction and architecture (ISA) into a target ISA translated binary application with a source ISA application state maintained at selected commit point instructions within the translated application, in accordance with one embodiment of the present invention.

For example, as depicted with reference to FIG. 3, in one embodiment, source binary application 402 is translated according to, for example, a state map table 250, such as depicted in FIG. 2, as intermediate translated code 420. Within the intermediate translation, one or more commit point instructions may be selected. For example, as depicted in FIG. 3, ST4 instructions 422 and 424 and BR instruction 460 are selected as commit point instructions and identified overwritten state components are preserved to form modified, translated code 450 as commit point instructions 452, 456 and 460. Accordingly, if an exception or execution stoppage occurs at a non-commit point instruction, the instructions may be executed until a commit point instruction is detected. Once detected, source ISA application state components are available, as described in further detail below.

Figure 10:
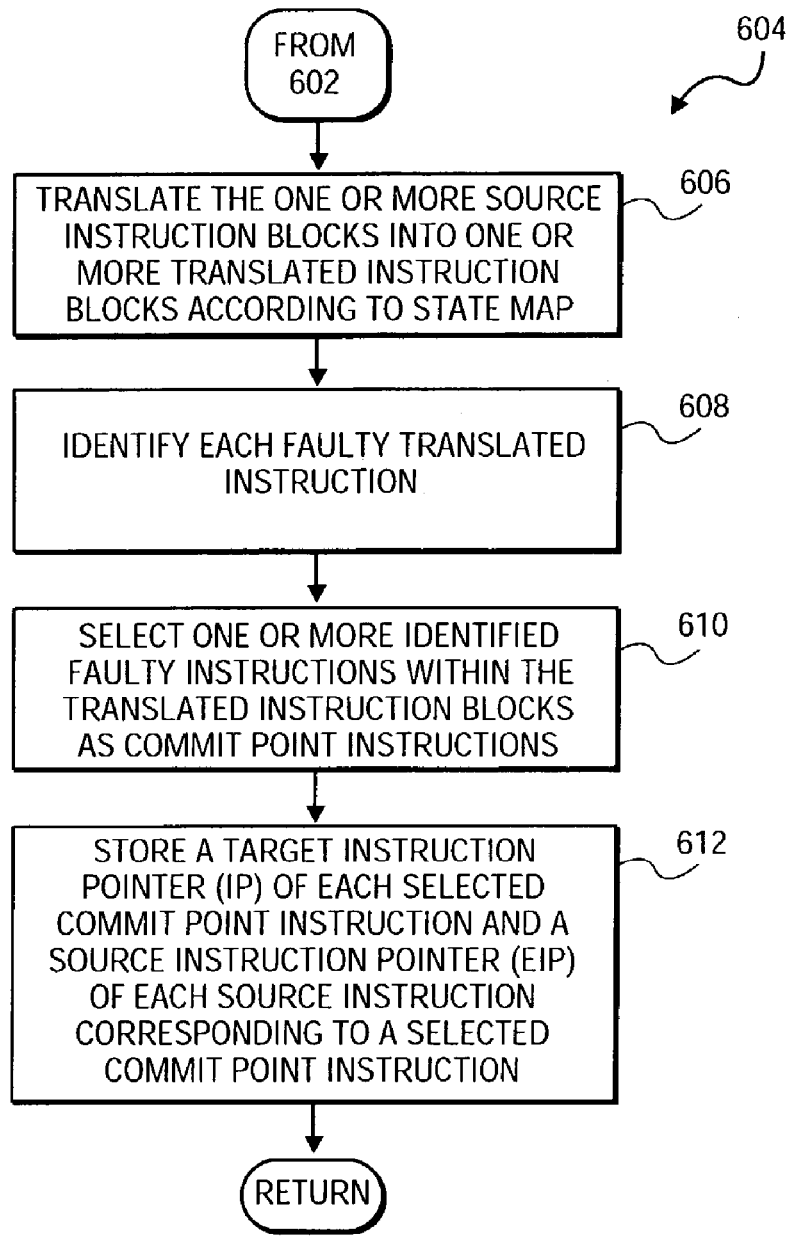
FIG. 10 is a flow chart illustrating a method for translating the source binary application, as depicted in FIG. 9, in accordance with one embodiment of the invention.

FIG. 10 is a flow chart illustrating a method 604 for translating the source binary application of process block 602, as depicted in FIG. 9, in accordance with one embodiment of the invention. At process block 606, the one or more source instruction blocks are translated into one or more translated instruction blocks, according to a state map table. For example, as illustrated in FIG. 3, the intermediate translation is shown as instruction block 420, with the translated instructions using mapped state component registers rEBP, rEAX, and rESP. At process block 608, each faulty instruction within the intermediate translated code is detected.

For example, as depicted in FIG. 3, instructions which may cause exceptions, such as, for example, ST4 instructions 422 and 424 are detected. At process block 610, one or more of the identified faulty instructions are selected as commit point instructions. In one embodiment, each faulty instruction can be selected as a commit point instruction, for example, as depicted in FIG. 3. Next, at process block 612, a target instruction pointer (IP) of each selected commit point instruction and a source instruction pointer (EIP) of each source instruction corresponding to a selected commit point instruction is stored, for example, as depicted commit point information (470, 480 and 490) of translated code 450, as depicted in FIG. 3.

Figure 11:
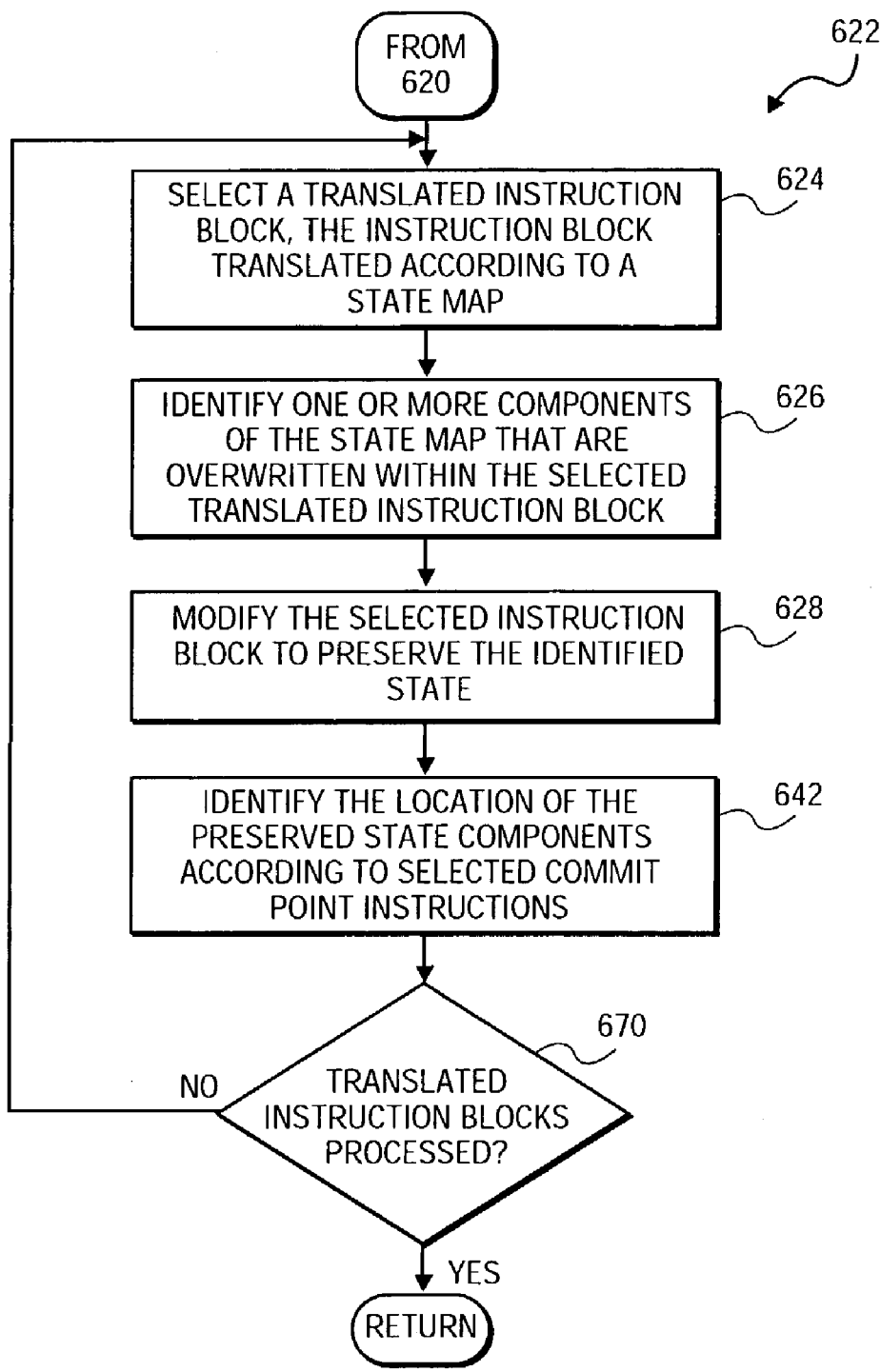
FIG. 11 is a flow chart illustrating a method for modifying translated instructions blocks, as depicted in FIG. 9, in accordance with one embodiment of the invention.

FIG. 11 is a flow chart illustrating a method 622 for modifying translated instruction blocks of process block 620, as depicted in FIG. 9, in accordance with one embodiment of the invention. At process block 624, a translated instruction block is selected. In one embodiment, the translated instruction block refers to an intermediate translated instruction block, according to a state map table, for example, as depicted in FIG. 2. At process block 626, one or more components of the state map data structure are identified that are overwritten within a selected instruction block.

For example, as illustrated with reference to FIG. 3, the state components refer to target ISA registers rESP 430 and rEBP 432 since values of the registers are overwritten within the instruction block 420. At process block 628, the selected instruction block is modified to preserve the identified state components until the selected translated instruction block successfully executes. For example, as depicted with reference to FIG. 3, modified, translated code 450 stores rESP register within rRen2 register. In addition, rRen1 and rRen3 registers are used for values of rESP register.

At process block 642, the location of the preserved state component is identified according to the selected commit point instructions. For example, as illustrated with reference to commit table 240, as depicted in FIG. 2, the locations of the source state components are identified within an entry of the table corresponding to the commit point (source state components). For example, as illustrated in FIG. 3, commit point instruction 450 stores EIP equal to 1000, whereas commit point instruction 454 stores the EIP value, as well as the locations of the rESP register and rEBP register values. At process block 670, process blocks 624–642 are repeated until each translated instruction block is processed.

Figure 12:
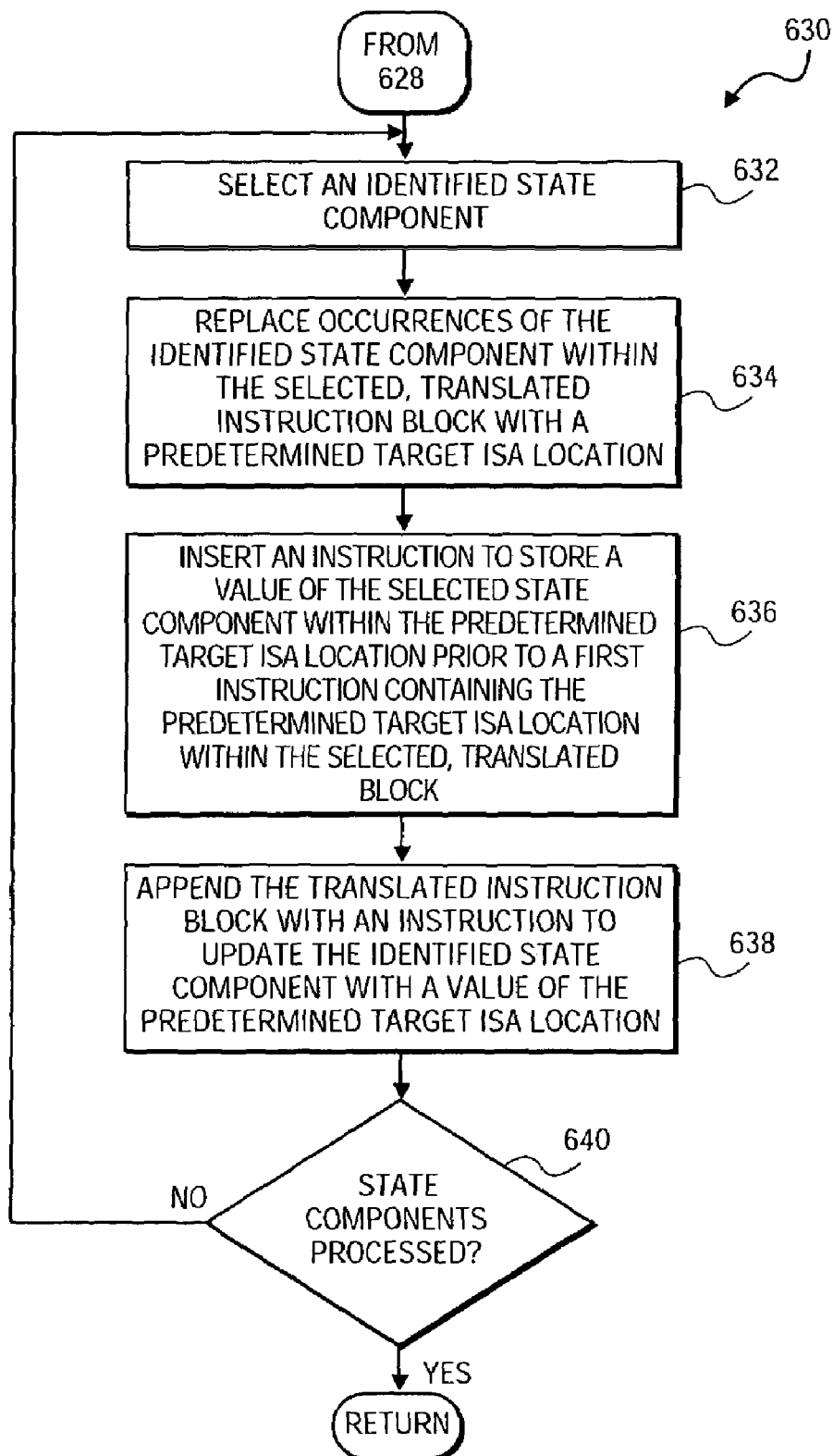
FIG. 12 is a flow chart illustrating a method for modifying the selected instruction block, as depicted in FIG. 11, in accordance with one embodiment of the invention.

FIG. 12 is a flow chart illustrating a method 630 for modifying the selected instruction block of process block 628 of FIG. 11, in accordance with one embodiment of the invention. At process block 632, an identified, overwritten state component is selected. Once selected, at process block 634, occurrences of the identified state component, within the selected translated instruction block, are replaced within a predetermined target ISA location. For example, as depicted with reference to FIG. 3, rRen1 and rRen2 refer to predetermined target ISA locations. For example, in this embodiment, the state components refer to registers of the target ISA.

However, in alternative embodiments, the predetermined target ISA location may refer to memory locations, stack pointers, floating point registers, state flags, or the like, in addition to general purpose registers. As such, rESP register is replaced within translated code 450 with rRen2 register. This process is repeated for the rRen1 and rRen3 registers. Accordingly, the functionality of intermediate translated code 420 may be performed while preserving the values of identified source ISA state components. The location of the preserved state components is maintained at the various commit point instructions, in accordance with one embodiment of the invention.

Accordingly, at process block 636, an instruction to preserve the value of the selected state component is inserted prior to a first instruction that overwrites the predetermined target ISA component location. Likewise, the translated instruction block is appended with an instruction to update the identified state component with a value that is contained within the predetermined target ISA location. As such, in the embodiment described, MOV instruction 458 is inserted to update the value of EBP register following commit point instruction 456. In an alternative embodiment, the translator may be configured to update the mapped target ISA state components following successful execution of translated instruction blocks. At process block 640, process blocks 632–638 are repeated until each identified state component is processed.

Figure 13:
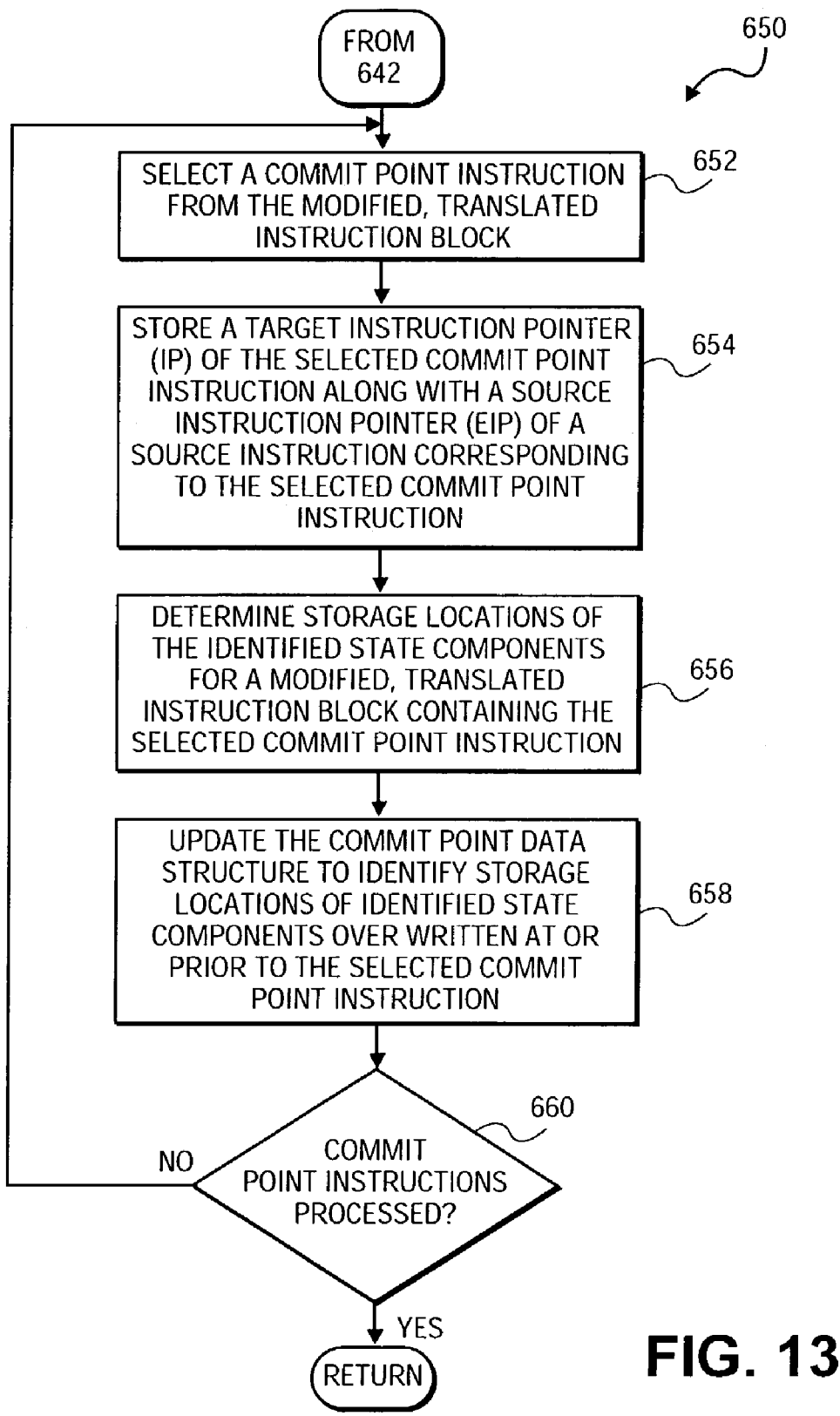
FIG. 13 is a flow chart illustrating a method for identifying the location of preserved state components, as depicted in FIG. 11, in accordance with a further embodiment of the present invention.

Finally, FIG. 13 is a flow chart illustrating a method 650 for identifying the location of preserved state components of process block 642 of FIG. 11, in accordance with a further embodiment of the present invention. At process block 652, a commit point instruction is selected from the modified translated instruction block. Once selected, at process block 654, a target IP of the selected commit point instruction, as well as a source IP (EIP) of the source instruction, corresponding the to the selected commit point instruction, are stored. In one embodiment, the storage is performed within, for example, a commit point table such as depicted in FIG. 2.

At process block 656, storage locations of identified state components for a modified instruction block are determined. Once determined, at process block 658, the commit point data structure is updated to identify storage locations of identified state components overwritten at or prior to the selected commit point instruction. Finally, at process block 660, process block 652–658 are repeated until each commit point instruction is processed. For example, as depicted with reference to FIG. 3, commit point instruction 456 is updated with the location of rESP values, as well as rEBP values. However, commit point instructions 452 and 458 do not contain overwritten values since either overwrites do not occur prior to the commit point instruction or the preserved values may be updated prior to the commit point.

Accordingly, in one embodiment, by generating the commit point data structure which identifies commit point instructions selected within translated instruction blocks, overwritten components of a source ISA application state may be preserved. As a result, if an exception occurs, the values are not lost. Therefore, using the commit point data structure, as well as a canonic or state map of source ISA state components, a dynamic binary translator may reproduce a source ISA application state in response to an execution stoppage, such as exceptions or interruptions.

This state information may be provided to, for example, the operating system which provides the source ISA application state to, for example, a source binary application exception handler. In addition, during an interruption, a consistent source ISA state may be maintained to enable continued execution following the interruption. In a further embodiment of the invention, identification of source ISA state components corresponding to selected commit point instructions enables reordering of instructions identified within the source ISA application, which are repeated.

As such, repeated instructions may be optimized. In one embodiment, instructions are reordered to enable parallel execution without loosing the ability to restore a consistent ISA application state in the event of an execution stoppage. In one embodiment, this is performed by preserving the order of selected commit point instructions. In an alternative embodiment, only a predetermined portion of the faulty instructions are selected as commit point instructions, which further expands the capability to reorder translated instructions to enable parallel execution as provided by VLIW architectures, as well as EPIC architectures, for example, as provided within computer system 100, as depicted in FIG. 1.

ALTERNATE EMBODIMENTS

Several aspects of one implementation of the dynamic translation for providing reproduction of a source ISA application state for a target ISA application state, have been described. However, various implementations of the dynamic translation provide numerous features including, complementing, supplementing, and/or replacing the features described above. Features can be implemented as part of the software execution layer or as part of the hardware execution in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to a source ISA state reproduction, it will be appreciated by those skilled in the art that the embodiments of the present invention can be applied to other systems. In fact, systems for binary translation fall within the embodiments of the present invention, as defined by the appended claims. The embodiments described above were chosen and described in order to best explain the principles of the embodiments of the invention and its practical applications. These embodiments were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
   executing a translated binary application, the binary application translated from a source instruction set architecture (ISA) to a target ISA;
   identifying a translated instruction at an identified execution stop point according to a received notification of an execution stop of the translated binary application;
   executing instructions within the translated binary application beginning with the identified translated instruction at the identified execution stop point until a predetermined commit point instruction is detected; and
   determining a source ISA application state of a source binary application corresponding to an application state of the translated application at the predetermined commit point instruction.

2. The method of claim 1, wherein determining the source ISA application state further comprises:
   determining a source ISA application state according to one or more values identified by the predetermined commit point instruction.

3. The method of claim 1, wherein executing the translated binary application further comprises:
   identifying locations of one or more source ISA state components listed in a commit point map table according to the commit point instruction;
   selecting source ISA state component values according to the locations indicated in the commit point map table; and
   updating a source ISA application state following execution of most recently executed translated instruction block according to the selected source ISA state component values.

4. The method of claim 1, wherein determining the source ISA application state further comprises:
   selecting an instruction pointer of a source instruction stored prior to notification of the execution stoppage;

determining a translated instruction block containing one or more instructions corresponding to the scarce instruction;

executing instructions beginning at a first identified translated instruction within the translated instruction block until a commit point instruction is detected; and determining a source ISA application state according to one or more values contained within a state mapping table according to the detected commit point instruction and an application state prior to execution of the translated instruction block.

5. The method of claim 1, wherein determining the source ISA application state further comprises:

selecting an instruction pointer of a source instruction stored prior to notification of the execution stoppage;

determining a source instruction block containing the source instruction according to an instruction sequence number identified by the instruction pointer; and translating the source instruction block to determine a source ISA application state corresponding to the source instruction.

6. An article of manufacture including a machine readable medium having stored instructions to program a system to perform a method comprising:

executing a translated binary application, the binary application translated from a source instruction set architecture (ISA) to a target ISA;

identifying a translated instruction at an identified execution stop point according to a received notification of an execution stop of the translated binary application;

executing instructions within the translated binary application beginning with the identified translated instruction at the identified execution stop point until a predetermined commit point instruction is detected; and determining a source ISA application state of the source binary application corresponding to an application state of the translated application at the predetermined commit point instruction.

7. The article of manufacture of claim 6, wherein determining the source ISA application state further comprises:

determining a source ISA application state according to one or more values identified by the commit point instruction if the identified instruction corresponds to a predetermined commit point instruction.

8. The article of manufacture of claim 6, wherein executing the translated binary application further comprises:

identifying location of one or more source ISA state components listed in a commit point map table according to the commit point instruction;

selecting source ISA state components according to the locations indicated in the commit point map table; and updating a source ISA application state following execution of mast recently executed translated instruction block according to the selected source ISA state components.

9. The article of manufacture of claim 6, wherein determining the source ISA application state further comprises:

selecting an instruction pointer of a source instruction stored prior to notification of the execution stoppage;

determining a translated instruction block containing one or more instructions corresponding to the source instruction;

executing instructions beginning at a first identified translated instruction within the translated instruction block until a commit point instruction is detected; and determining a source ISA application state according to one or more values contained within a state mapping table according to the detected commit point instruction and an application state prior to execution of the translated instruction block.

10. The article of manufacture of claim 6, wherein determining the source ISA application state further comprises:

selecting an instruction pointer of a source instruction stored prior to notification of the execution stoppage;

determining a source instruction black containing the source instruction according to an instruction sequence number identified by the instruction pointer; and translating the source instruction block to determine a source ISA application state corresponding to the source instruction.

11. A method comprising:

translating at least one source instruction block of a binary application generated for a source instruction set architecture (ISA) into at least one translated instruction block for a target ISA;

modifying the translated instruction block to store, within the translated instruction block, each source ISA stare component that is overwritten within the translated instruction block, prior to overwriting of the source ISA state component within the translated block to enable reproduction of a source ISA application state at a selected commit point instruction of the translated instruction block; and modifying the translated instruction block to update each stored source ISA state component subsequent to the selected commit point instruction; and executing the translated instruction block.

12. The method of claim 11, wherein translating the source ISA binary application further comprises:

translating one or more source instruction blocks into one or more translated instruction blocks according to a state map, the state map including a mapping of source ISA state components into target ISA state components;

identifying each faulty translated instruction;

selecting one or more identified faulty instructions within the translated instruction blocks as commit point instructions storing a target instruction pointer (IP) of each selected commit point instruction and a source instruction pointer (EIP) of each source instruction corresponding to a selected commit point instruction.

13. The method of claim 11, wherein modifying the translated instruction blocks further comprises:

selecting a translated instruction block, the instruction block translated according to a state map, the state map including a mapping of source ISA state components into target ISA state components;

identifying one or more components of the state map that are overwritten within the selected translated instruction block;

modifying the selected instruction block to preserve the identified state components until the selected translated instruction block successfully executes;

identifying the location of the preserved state components according to selected commit point instructions; and repeating, selecting, identifying, modifying and identifying for each translated instruction block.

14. The method of claim 13, wherein modifying the selected instruction block further comprises:

selecting an identified state component;

replacing occurrences of the identified state component within the selected, translated instruction block with a predetermined target ISA location;

inserting, within the selected, translated instruction block, an instruction to store a value of the selected state component within the predetermined target ISA location prior to a first instruction containing the predetermined target ISA location;

appending the translated instruction block with an instruction to update the identified state component with a value of the predetermined target ISA location; and repeating the selecting, replacing, inserting and appending for each identified state component within the selected, translated instruction blocks.

15. The method of claim 13, wherein identifying the location of the preserved state components further comprises:

selecting a commit point instruction from the modified, translated instruction block;

storing, within a commit point data structure, a target instruction pointer (IP) of the selected commit point instruction along with a source instruction pointer (EIP) of a source instruction corresponding to the selected commit point instruction;

determining storage locations of the identified state components for a modified, translated instruction block containing the selected commit point instruction;

updating the commit point data structure to identify storage locations of identified state components over written at or prior to the selected commit point instruction; and repeating the selecting, storing, determining and updating for each commit point instruction within the modified, translated instruction block.

16. The method of claim 11, wherein executing further comprises:

selecting a translated instruction block;

executing the translated instruction block;

storing, during executing of the translated instruction block, an instruction pointer of a source instruction corresponding to a currently executed translated instruction;

updating a source ISA application state once the selected instruction block executes successfully; and repeating the selecting, executing and updating for each translated instruction block.

17. An article of manufacture including a machine readable medium having stored instructions to program a system to perform a method comprising:

translating at least one source instruction block of a binary application generated for a source instruction set architecture (ISA) into at least one translated instruction block for a target ISA;

modifying the translated instruction block to store, within the translated instruction block, each source ISA state component that is overwritten within the translated instruction block prior to overwriting of the source ISA state component within the translated block to enable reproduction of a source ISA application state at a selected commit point instruction of the translated instruction blocks; and modifying the translated instruction block, update each stored source ISA state component subsequent to the selected commit point instruction and executing the translated instruction block.

18. The article of manufacture of claim 17, translating the source ISA instruction blacks further comprises:

translating one or more source instruction blocks into one or more translated instruction blocks according to a slate map, the state map including a mapping of source ISA state components into target ISA state components;

identifying each faulty translated instruction;

selecting one or more identified faulty instructions within the translated instruction blocks as commit point instructions storing a target instruction pointer (IP) of each selected commit point instruction and a source instruction pointer (EIP) of each source instruction corresponding to a selected commit point instruction.

19. The article of manufacture of claim 17, wherein modifying the translated instruction blocks further comprises:

selecting a translated instruction block, the instruction block translated according to a state map, the state map including a mapping of source ISA state components into target ISA state components;

identifying one or more components of the state map that are overwritten within the selected translated instruction block;

modifying the selected instruction block to preserve the identified state components until the selected translated instruction block successfully executes;

identifying the location of the preserved state components according to selected commit point instructions; and repeating, selecting, identifying, modifying and identifying for each translated instruction block.

20. The article of manufacture of claim 19, wherein modifying the translated instruction blocks further comprises:

selecting an identified state component;

replacing occurrences of the identified state component within the selected, translated instruction block with a predetermined target ISA location;

inserting, within the selected, translated instruction block, an instruction to store a value of the selected state component within the predetermined target ISA location prior to a first instruction containing the predetermined target ISA location;

appending the translated instruction block with an instruction to update the identified state component with a value of the predetermined target ISA location; and repeating the selecting, replacing, inserting and appending for each identified state component within the selected, translated instruction blocks.

21. The article of manufacture of claim 19, identifying location of preserved state components further comprises:

selecting a commit point instruction from the modified, translated instruction block;

storing, within a commit point data structure, a target instruction pointer (IP) of the selected commit point instruction along With a source instruction pointer (EIP) of a source instruction corresponding to the selected commit point instruction;

determining storage locations of the identified state components for a modified, translated instruction block containing the selected commit point instruction;

updating the commit point data structure to identify storage locations of identified state components over written at or prior to the selected commit point instruction; and repeating the selecting, storing, determining and updating for each commit point instruction within the modified, translated instruction block.

22. The article of manufacture of claim 17, wherein executing further comprises:

selecting a translated instruction block;

executing the translated instruction block;

storing, during executing of the translated instruction block, an instruction pointer of a source instruction corresponding to a currently executed translated instruction;

updating a source ISA application state once the selected instruction block executes successfully; and repeating the selecting, executing and updating for each translated instruction block.

23. An apparatus comprising;

a processor; and a memory coupled to the processor, the memory including a translator to modify at least one translated instruction block to store, within the translated instruction block, each source ISA state component that is overwritten within the translated instruction block, prior to overwriting of the source ISA state component within the translated block to enable reproduction of a source ISA application stare at a selected commit point instruction of the translated instruction block and to modify the translated instruction block to update each stored source ISA state component subsequent to the selected commit point instruction.

24. The apparatus of claim 23, wherein the translator determines a source ISA application state of a source binary application corresponding to an application state of a translated application at an identified execution stop point.

25. The apparatus of claim 23, wherein the translator maintains during execution of translated instruction blocks, a source ISA application state corresponding to a target ISA application state at selected commit point instructions within the translated instruction blocks.

26. A system, comprising:

a processor;

a memory controller coupled to the processor; and a memory coupled to the memory controller, the memory including a translator to modify at least one translated instruction block to store at least one source ISA state component prior to overwriting of the source ISA state component within the translated block to enable reproduction of a source ISA application state at a selected commit point instruction of the translated instruction block and to modify the translated instruction block to update the source ISA state component subsequent to the selected commit point instruction.

27. The system of claim 26, wherein the translator determines a source ISA application state of a source binary application corresponding to an application state of a translated application at an identified execution stop point.

28. The system of claim 26, wherein the translator maintains, during execution of translated instruction blocks, a source ISA application state corresponding to a target ISA application state at selected commit point instructions within the translated instruction blocks.

29. A method comprising:

translating at least one source instruction blocks of a binary application generated for a source instruction set architecture (ISA) into at least one translated instruction blocks for a target ISA:

modifying the translated instruction blocks to store, within the translated instruction block, each source ISA state component that is overwritten within the translated instruction block, to enable reproduction of a source ISA application state at a selected commit point instructions of the translated instruction blocks;

analyzing a source binary application to identify instructions that are repeated;

reordering translated instructions corresponding to identified source instructions that are repeated to enable parallel execution of the corresponding translated instructions while maintaining order of selected commit point instructions; and executing the translated instruction blocks.

30. An article of manufacture including a machine readable medium having stored instructions to program a system to perform a method comprising:

translating at least one source instruction blocks of a binary application generated for a source instruction set architecture (ISA) into at least one translated instruction block for a target ISA:

modifying the translated instruction blocks to store, within the translated instruction block, each source ISA state component that is overwritten within the translated instruction block to enable reproduction of a source ISA application state at a selected commit point instructions of the translated instruction blocks;

analyzing the source binary application to identify instructions that are repeated;

reordering translated instructions corresponding to identified source instructions that are repeated to enable parallel execution of the corresponding translated instructions while maintaining order of selected commit point instructions; and executing the translated instruction blocks.

* * * * *

UNITED STATES PATENT AND TRADEMARK OFFICE
CERTIFICATE OF CORRECTION

PATENT NO. : 7,076,769 B2  
APPLICATION NO. : 10/401468  
DATED : July 11, 2006  
INVENTOR(S) : Baraz Page 1 of 1

It is certified that error appears in the above-identified patent and that said Letters Patent is hereby corrected as shown below:

In column 13, at line 2, delete "scarce" and insert --source--.

In column 13, at line 9, delete "tableaccording" and insert --table according--.

In column 13, at line 53, delete "mast" and insert --most--.

In column 14, at line 8, delete "black" and insert --block--.

In column 14, at line 20, delete "stare" and insert --state--.

In column 15, at line 65, delete "blacks" and insert --blocks--.

In column 16, at line 1, delete "slate" and insert --state--.

In column 16, at line 52, delete "With" and insert --with--.

In column 17, at line 19, delete "stare" and insert --state--.

In column 17, at line 29, after "maintains" insert --,--.

In column 18, at line 10, delete "blocks" and insert --block--.

In column 18, at line 28, delete "blocks" and insert --block--.

In column 18, at line 32, delete "blocks" and insert --block--.

In column 18, at line 37, delete "instructions" and insert --instruction--.

Signed and Sealed this

Seventeenth Day of October, 2006

JON W. DUDAS  
*Director of the United States Patent and Trademark Office*